(12) United States Patent
Hatlehol et al.

(10) Patent No.: US 8,844,794 B2
(45) Date of Patent: Sep. 30, 2014

(54) JIG FOR WELDED BULKHEAD FITTING

(75) Inventors: Björn Förde Hatlehol, Vestnes (NO); Jonny Sundkvist, Vestnes (NO); Tom Richard Bauer, Vestnes (NO)

(73) Assignee: West Partner AS, Vestnes (NO)

( * ) Notice: Subject to any disclaimer, the term of this patent is extended or adjusted under 35 U.S.C. 154(b) by 0 days.

(21) Appl. No.: 13/979,862

(22) PCT Filed: Jan. 18, 2012

(86) PCT No.: PCT/NO2012/050003
§ 371 (c)(1),
(2), (4) Date: Jul. 16, 2013

(87) PCT Pub. No.: WO2012/099475
PCT Pub. Date: Jul. 26, 2012

(65) Prior Publication Data
US 2013/0292453 A1 Nov. 7, 2013

(30) Foreign Application Priority Data

Jan. 21, 2011 (NO) .................................. 20110097

(51) Int. Cl.
*B23K 37/04* (2006.01)

(52) U.S. Cl.
CPC .................................. *B23K 37/0443* (2013.01)
USPC ......................................... 228/44.3; 228/49.1

(58) Field of Classification Search
None
See application file for complete search history.

(56) References Cited

U.S. PATENT DOCUMENTS

| | | | | |
|---|---|---|---|---|
| 2,379,136 A | * | 6/1945 | Erwin et al. | 269/8 |
| 3,491,995 A | * | 1/1970 | Taraba | 269/8 |
| 4,735,353 A | * | 4/1988 | Thomson et al. | 228/114.5 |
| 7,413,106 B2 | * | 8/2008 | Wuersch et al. | 228/8 |
| 8,334,474 B1 | * | 12/2012 | Oatridge et al. | 219/86.9 |
| 2002/0144776 A1 | | 10/2002 | Bonnell | |
| 2013/0126501 A1 | * | 5/2013 | Fujiuchi et al. | 219/137 R |
| 2013/0134153 A1 | * | 5/2013 | Schmitt et al. | 219/617 |

FOREIGN PATENT DOCUMENTS

| | | |
|---|---|---|
| FR | 2801001 A1 | 5/2001 |
| GB | 971831 A * | 10/1964 |
| JP | 02-133195 A * | 5/1990 |
| WO | 2010135788 A1 | 12/2010 |

OTHER PUBLICATIONS

International Search Report and Written Opinion dated Apr. 2, 2012.

* cited by examiner

*Primary Examiner* — Kiley Stoner
(74) *Attorney, Agent, or Firm* — Alix, Yale & Ristas, LLP

(57) ABSTRACT

Jig (10, 10', 10") for welded bulkhead fitting (18) to a steel material which is to be penetrated by the fitting, said jig comprising a foot (11), a holder (14) for the fitting, a connecting piece (13) between the foot and the holder. The foot (11) is provided with an on and off switchable magnet (12) and the holder (14) is height adjustable and replaceable. The angle between the holder (14) and the foot (11) is preferably adjustable.

14 Claims, 2 Drawing Sheets

JIG FOR WELDED BULKHEAD FITTING

BACKGROUND

Disclosed herein is a jig for use when welding a bulkhead fitting to steel materials to be penetrated by the bulkhead fitting.

When welding a bulkhead fitting, typically made of steel or stainless steel, the bulkhead fitting (ESV) is typically held manually with one hand while the other hand is used to spot weld. After the first spot has been welded, the ESV requires angular adjustment or adjustment with an inch rule, whereafter a spot weld diagonally in relation to the first spot is applied, whereafter adjustment perpendicular to the first one is required, followed by spot welding at two additional points. The bulk fitting is typically terminated with an external thread intended for being connected to an Ermeto nut.

US patent application No. 2002/0144776 describes a device intended for cutting holes in a steel pipe and welding thereto a threaded fitting which is branched from said pipe. In connection with the latter operation the threaded fitting to be welded is indicated to be held by a fixture with a magnet while the fixture itself also is arranged to be immobilized by means of permanent magnets.

There are no known methods or devices for simplifying welding of bulkhead fitting to plates to be penetrated by pipes so that a quick, reproducible and exact welding may be performed and such that the threaded portion of the bulkhead fitting is protected from damage caused by weld sputter or other external influences during the operation. It would be useful to provide such a device for rendering possible welding of bulkhead fittings in a quick, easy manner with very little margin of error with respect to positioning.

BRIEF DESCRIPTION OF THE DRAWINGS

The disclosed device is described in more detail in the form of illustrated embodiments and with reference to the drawings in which concurrent details are shown with same reference number.

DETAILED DESCRIPTION

Figure 1:
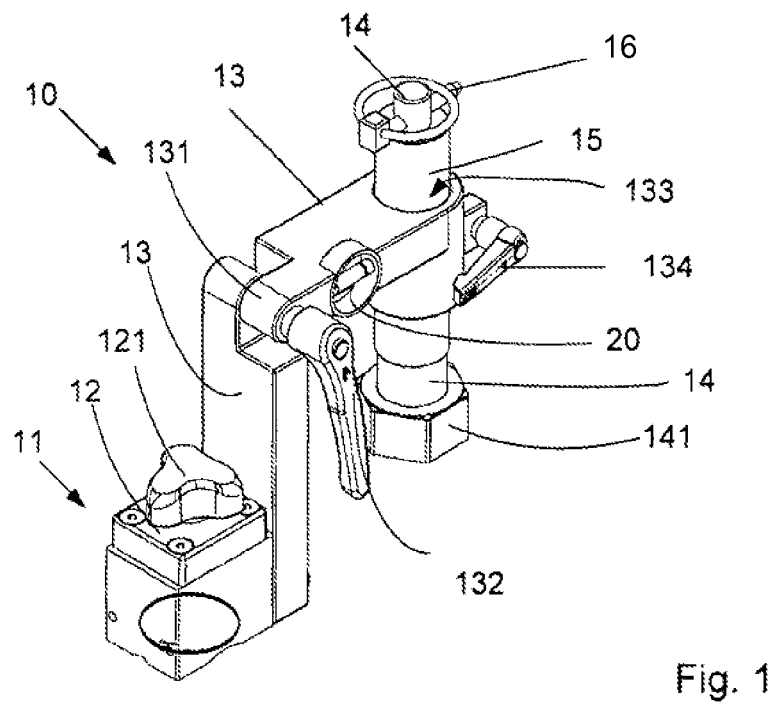
FIG. 1 shows a preferred embodiment of a jig according to the present invention.

FIG. 1 shows a jig 10 comprising a foot 11 which holds or comprises a magnet 12 which is arranged to be switched on and off. To the foot 11 a connecting piece 13 is attached which in the shown alternative exhibits a joint 131. The connecting piece is terminated in an opening 133 which can be tightened or slackened by a lever 134. The opening 133 has approximately the same diameter as a holding collar 15 arranged to be locked in the opening 133 and which has an inner diameter that corresponds to the outer diameter of the holder 14 for the bulkhead fitting. The holding collar 15 is not a mandatory feature since it is fully feasible to allow the holder 14 be locked to the connecting piece 13 directly, but there are certain advantages associated with use of such a holding collar 15.

The holder 14 is at its upper end provided with a hole suitable to receive a cotter pin (16) or the like, locking the holder 14 to the holding collar 15 as long as the pin is in place. The holder 14 is at its lower end provided with an end piece having the shape of a nut with an internal thread corresponding to the external thread of the bulkhead in question. It should be emphasized that the holder 14 can be axially locked to the holding collar with any suitable means, but a cotter pin is a good alternative since it can be attached and released without the aid of tools and is a standard component that may be purchased from many sources at a reasonable cost.

When using a holder 14 provided with a holding collar 15 it is simple to change holder, by removing the cotter pin 16, pulling out the holder 14, pushing in another holder with e.g. another thread dimension of the Ermeto nut 141 constituting the lower part of the holder 14. Alternatively the length of the holders 14 can be different as opposed to, or in addition to, the thread dimension. A person skilled in the art will understand that the Ermeto nut 141 easily can be replaced if needed and it is actually only a matter of definition whether it is part of the holder 14 or if it constitutes a separate part of the jig.

The joint 131 is a preferred embodiment and allows the bulkhead fitting easily to be arranged inclined to the plate being penetrated with an angle reproducible from one fitting to the next. The joint can be locked and released by means of a lever 132. A water level 17 on the outer part of the connecting piece 13 is also shown. This can optionally be pivotal in relation to the connecting piece, also optionally provided with click-stops and/or indicating angular degrees at the circumference of the water level, making it easy to find and adjust certain angles different from 90 degrees in relation to the substrate. It should also be mentioned that the joint 131 need not be arranged at the center of the connecting piece 13 and need not divide the connecting piece in two parts perpendicular to each other.

When a bulkhead fitting is attached to the Ermeto nut 141 and the height of the holder 14/holding collar 15 is correctly adjusted, the magnet being switched off, it is easy to place the foot exactly in the desired position so that the bulkhead fitting/socket is correctly centered in the relevant hole in a relevant plate. Then the magnet is turned on to lock the jig, thereby locking the bulkhead fitting to the plate with such a force that there is no risk of displacement due to outer influence that might occur during the welding process.

Since the Ermeto nut 141 is screwed onto the thread of the bulkhead fitting during welding, the thread is protected from damage due to weld sputter or in any other way during the work. If a number of bulkhead fittings are to be mounted near one another, the threads of the already mounted bulkhead fitting should be protected until the entire job is completed.

Figure 2:
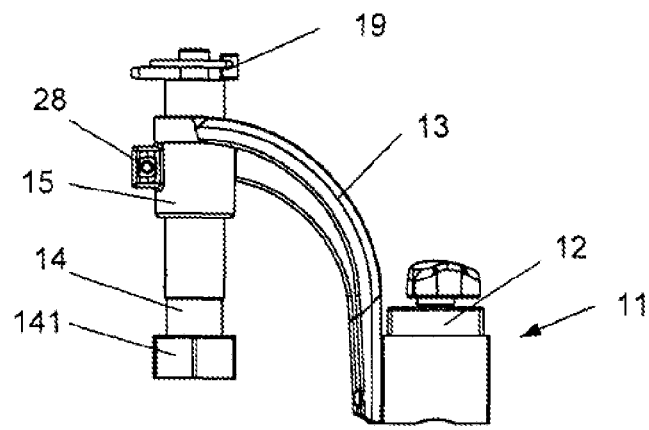
FIG. 2 shows an alternative embodiment of the present invention.

FIG. 2 shows a jig 10' corresponding to the jig in FIG. 1 with the exception that the connecting piece 13 is not provided with a joint.

Figure 3:
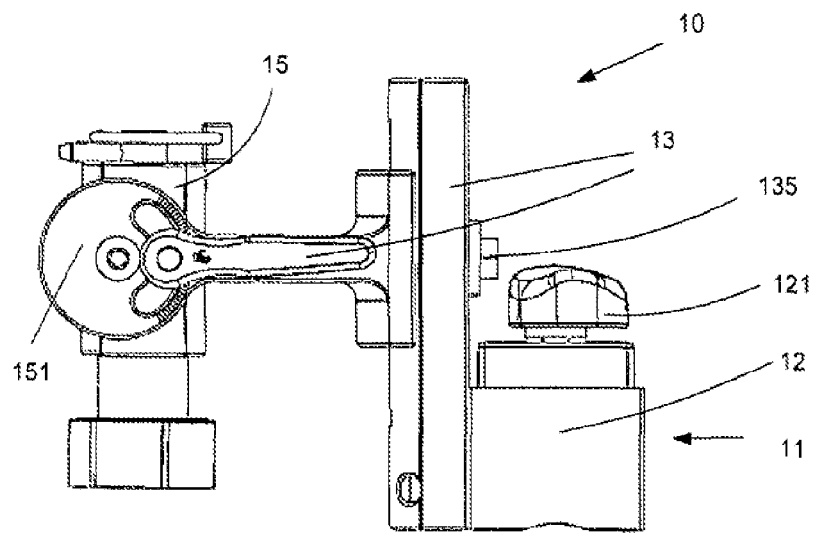
FIG. 3 shows yet another embodiment of the present invention.

FIG. 3 shows still another embodiment of the present invention. Like the jig 10 of FIG. 1, the jig 10" shown in FIG. 3 may be arranged at angles other than perpendicular to the support under the foot 11. The operation of accomplishing arrangement is different. Firstly the connecting piece 13 is divided in such a way that the part not permanently attached to the foot 11, is height adjustable in relation to the part attached to the foot 11, but not angularly adjustable. Instead the connecting piece 13 is attached to the holding collar 15 via a graded disc 151 having an extended, through and curved slot substantially parallel to the periphery of the disc 151 so that different angles can be chosen between the connecting piece 13 and the holding collar 15. Otherwise the holding collar 15 and the holder 14 may be identical to the variant shown in FIG. 1 or in FIG. 2. The two separate parts constituting the connecting piece 13 can at their mutual interface be provided with ridges or grooves that mutually lock one another when forced against one another by a tightening member 135. The tightening member 135 can comprise a bolt which can be tightened by a nut or by a pre-tensioned spring which for height adjustment can be temporarily released by hand.

Figure 4:
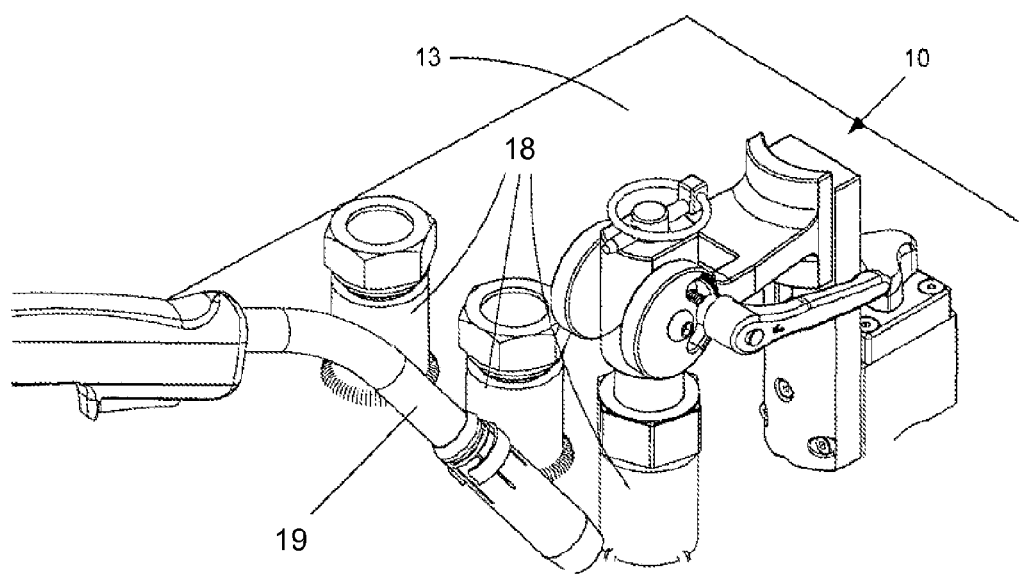
FIG. 4 shows a utilizational situation of the embodiment of the jig shown in FIG. 3.

FIG. 4 shows the jig 10" from FIG. 3 in use wherein numerous bulkhead fittings (ESV) 18 are about to be welded to a plate 20. Two of the bulkhead fittings 18 are already welded to the plate while spot welding of a third is being performed by the weld head 19.

With regard to choice of materials, it is convenient that materials are chosen allowing the jig to be easy to transport but at the same time sufficiently robust. For instance the connecting piece and a holding collar may be made in a strong synthetic material which is significantly lighter than metal, while the holder itself preferably is made of metal or other material able to withstand temperatures likely to occur near welding points. Furthermore the connecting piece can be shaped with profiles or a lattice structure which contributes to high strength/flexural rigidity at comparatively low cross-sections.

The magnet 12 can be of any kind of suitable switchable magnet but it is preferred that it is of type Magswitch® since these does not require connection to a power net. The magnet can be part of the foot or principally constitute the entire foot of the jig. It may also be integrated in the foot in a manner so it is not visible with the exception of the control member to switch it on and off. It is naturally also possible to allow the on/off function of the magnet to be controlled remotely.

While a preferred embodiment has been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

The invention claimed is:

1. A jig (10, 10', 10") for welding a bulkhead fitting (18) to a surface material which is to be penetrated by the fitting, comprising a foot (11), a holder (14) for the fitting, a connecting piece (13) between the foot and the holder and a replaceable fitting with inner threading (141) on the holder configured to mate with outer threading on the bulkhead, wherein the foot (11) is provided with an on and off switchable magnet (12) and the holder (14) is height adjustable and replaceable.

2. The jig of claim 1, wherein the holder (14) is arranged to have its height adjusted without requiring use of tools.

3. The jig of claim 1, wherein the holder (14) is arranged to be released from the connecting piece (13) without requiring use of tools.

4. The jig of claim 3, comprising a holding collar (15) for attaching the holder (14) to the connecting piece (13).

5. The jig of claim 4, wherein the connecting piece (13) defines an opening (133) through which the holding collar (15) may extend for tightening attachment to the connecting piece.

6. The jig of claim 5, wherein the through opening (133) is configured to be tightened via a lever (134) arranged to be operated with one hand.

7. The jig of claim 4, wherein the holder (14) defines an axial direction and has a through opening configured to receive an elongate pin (16) for locking the holder (14) axially to the holding collar (15).

8. The jig of claim 4, wherein the holder (14) is configured to cover threading of the bulkhead fitting when attached, thereby protecting the threading from damage during the welding process.

9. The jig of claim 1, wherein the connecting piece (13) includes a pivotal joint (131) for inclining the holder (14) at various angles relative to the surface material.

10. The jig of claim 4, wherein the holding collar (15) is attached to the connecting piece (13) via a pivotal disc (151).

11. The jig of claim 10, wherein the disc (151) is graded.

12. The jig of claim 7, wherein the pin (16) is a cotter pin.

13. The jig of claim 8, comprising a replaceable fitting with inner threading (141) on the holder (14) configured to mate with outer threading on the bulkhead fitting.

14. The jig of claim 4, wherein the connecting piece (13) includes a pivotal joint (131) for inclining the holder (14) at various angles relative to the surface material.

* * * * *